United States Patent [19]

Baermann

[11] 4,341,290

[45] Jul. 27, 1982

[54] DEVICE FOR AUTOMATICALLY CONTROLLING THE BRAKING FORCE OF AN EDDY CURRENT AND/OR FRICTION TRACK BRAKE

[76] Inventor: Max Baermann, Postfach 26, 5060 Bergisch-Gladbach 1, Fed. Rep. of Germany

[21] Appl. No.: 155,471

[22] Filed: Jun. 2, 1980

[30] Foreign Application Priority Data

Jun. 12, 1979 [DE] Fed. Rep. of Germany ....... 2923739

[51] Int. Cl.$^3$ .............................................. B60L 7/28
[52] U.S. Cl. .................................................. 188/165
[58] Field of Search ............................. 188/165; 303/3

[56] References Cited

FOREIGN PATENT DOCUMENTS 971289 1/1959 Fed. Rep. of Germany ...... 188/165
6507452 12/1966 Netherlands ......................... 188/165

*Primary Examiner*—Duane A. Reger
*Attorney, Agent, or Firm*—Meyer, Tilberry & Body

[57] ABSTRACT

A shiftable or turnable permanent magnetic eddy current and/or friction track brake which automatically reduces the friction braking forces to usable limits as the vehicle slows down. The brake is movably supported on the vehicle in the line of movement and is biased in the direction of movement by resilient means. When the brake frictionally engages the track, it moves against the biasing means which shifts the magnets to a partly braking off position to reduce the friction forces.

9 Claims, 2 Drawing Figures

DEVICE FOR AUTOMATICALLY CONTROLLING THE BRAKING FORCE OF AN EDDY CURRENT AND/OR FRICTION TRACK BRAKE

This invention relates to a device for automatically controlling the braking force of an eddy current and/or friction track brake which is infinitely variable by means of shiftable or turnable permanent magnets, preferably arranged such that poles of alternate polarity result in the direction of motion, and which can be lowered onto the track for the purpose of braking by frictional forces.

BACKGROUND OF THE INVENTION

Wear-free electromagnetic and permanent magnetic eddy current and hysteresis brakes have already become known which are preferably provided with poles of alternate polarity in the direction of motion and serve the purpose of slowing down or decelerating the speed of high-speed track-bound vehicles. With the above referred to brakes, magnetic fields result due to the eddy currents generated in the track. These magnetic fields counteract the magnetic fields of the brake and thus produce considerable braking forces, especially at high speeds. At the same time the attractive force is reduced between track and brake.

At decreasing speeds the generation of eddy currents in the track is reduced so that their effect with respect to braking weakens. At low speeds considerable attractive forces result between track and brake because of the disappearing magnetic counterfields. These attractive forces try to press the eddy current brake onto the track.

For a long time magnetically operating friction brakes also have been known. With such brakes a braking or wearing element is pressed against the ferromagnetic track by means of magnetic attractive forces. Due to the resulting friction, a good braking effect is achieved. Because of the high wear this type of brake is less suitable for continuous braking operations at high speed.

A variable permanent magnetic brake with poles of alternate polarity, preferably in the direction of motion, can also be designed such that it operates as an almost wear-free eddy current or hysteresis brake at high speeds and as friction brake at low speeds. However, the change from eddy current to friction braking involves difficulties since in many cases braking by frictional forces results in sudden high decelerating forces.

THE INVENTION

To overcome the above referred to problems, it is the object of the invention to provide a device for automatically controlling the braking force of an eddy current and/or friction track brake which is infinitely variable by means of shiftable or turnable permanent magnets, with the permissible braking force, even at low speeds, not being exceeded when braking by frictional forces is started.

With a brake of the above referred to type this object is achieved by arranging the brake on the vehicle such that it is shiftable in the direction of motion relative to the length of the required control range and by providing a pressure or traction dependent control element between at least one face of the brake and elements fastened to the vehicle, with the control element being connected with the elements serving for shifting or turning the movable permanent magnets by means of, e.g., electric, pneumatic, hydraulic or mechanical operating means, for example toothed racks, in such a way that due to the pressure or traction of the brake produced during braking by frictional forces and acting on the control element(s) the braking force is reduced by shifting or turning the permanent magnets such that the permissible decelerating force is not exceeded.

In accordance with the invention, it is possible to control the permissible braking force automatically and without delay at the moment when braking by frictional forces already is started. Thus the disadvantages resulting because of sudden or jerky braking operations are avoided.

The principal advantage of the present invention is that because of reduced wear a longer life of the brake body is ensured and the track is exposed to less wear.

In a particularly simple embodiment, pressure springs are provided as control elements.

In a further preferred embodiment, the brake is arranged within a supporting body such that it is shiftable in the direction of motion by means of guide bolts and is held in central position by pressure springs under initial tension, with the supporting body being fastened to the vehicle and guided in vertical direction. This embodiment ensures in a simple manner that the automatic control of the braking force is effective in each direction of motion. Moreover, it is possible to determine at which braking force the control should become effective by the degree of initial tension of the springs.

DRAWINGS

The aforementioned objects and advantages will become apparent from the following description used to illustrate a preferred embodiment of the invention when read in connection with the accompanying drawings in which.

PREFERRED EMBODIMENT

Figure 1:
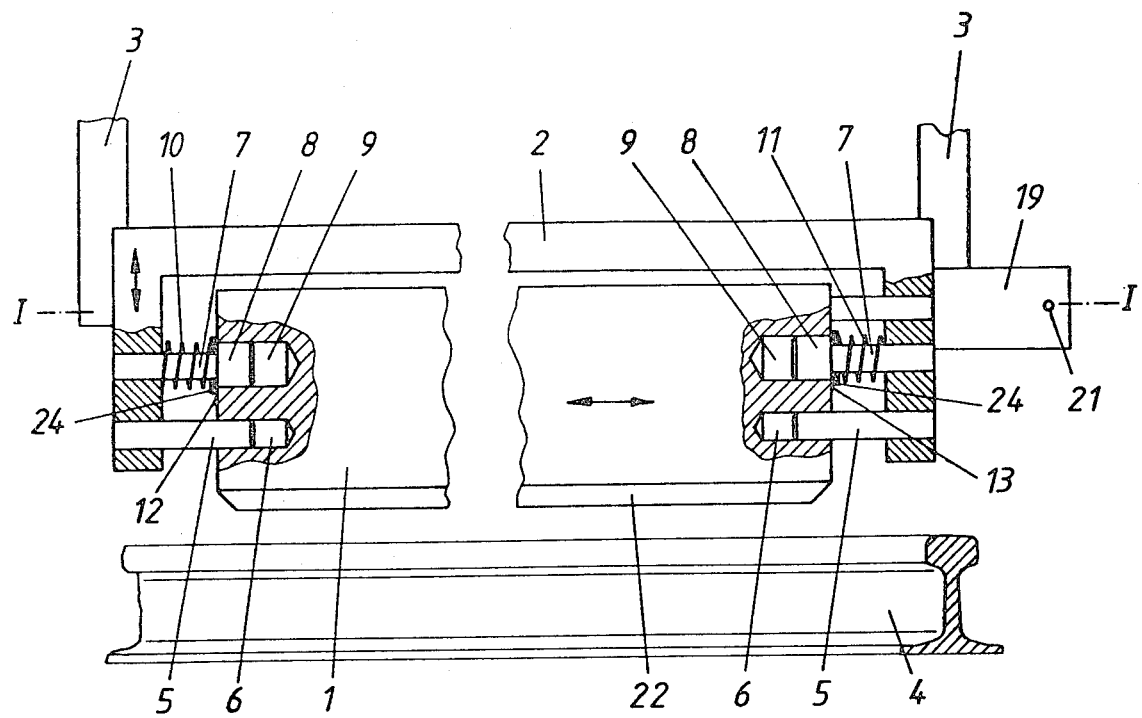
FIG. 1 is a schematic side elevational view of the brake.
Figure 2:
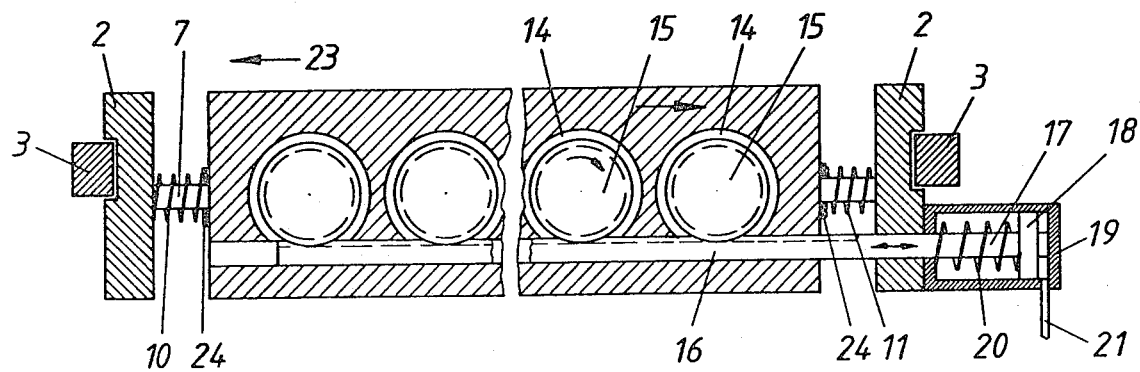
FIG. 2 is a horizontal section through the brake along the line 1—1 of FIG. 1.

The brake as shown in FIGS. 1 and 2 is a permanent magnetic track brake which is provided with poles of alternate polarity in the direction of motion and is infinitely variable from the switched-on to the switched-off position and vice versa. With this embodiment, the permanent magnets are turnable around an axis perpendicular to the running surface of the track. A brake of this type is described in the German patent application No. P 26 38 133.9 (U.S. Pat. No. 4,122,922). The control device according to the invention is also of advantage when used for a permanent magnetic brake wherein the permanent magnets are shiftable in the direction of motion for the purpose of an infinitely variable switching on and off operation.

According to FIG. 1 the brake 1 with its supporting body 2 is guided by guiding elements 3 fastened to the bogie, not shown in the drawing, so that it can be lowered onto the track 4 in vertical direction, as indicated by the drawn-in arrows.

As shown by the horizontal arrows, the brake 1 is shiftable in the direction of motion within the supporting body 2. For this purpose the guide bolts 5, which project into the holes 6 of the brake, are fastened to the supporting body 2. In addition, there are provided spring bolts 7 which also project into the holes 9 of the brake with their shoulder 8. The pressure springs 10 and 11 are arranged on the spring bolts. By means of the two pressure springs, which may be designed as spiral or cup springs, the brake is held in central position under a certain initial tension that is dependent on the desired amount of braking force when control should become effective. The initial tension force produced by the springs 10 and 11 should be higher than the shifting force required for switching the magnets on and off. In order to produce the initial tension, one end of the pressure springs 10 and 11 rests on the supporting body 2 and the other end on the disc 24 which is adjacent to the shoulder 8 or the faces 12, 13 of the brake. In lowered condition, the brake is shifted in the direction of motion against the pressure of the springs 10, 11 as soon as there is a braking force which is higher than the force of the springs under initial tension. This is the moment when the automatic control of the braking force becomes effective.

Switching on and off of the brake as well as its automatic control can be explained better by means of FIG. 2. As already mentioned in the foregoing, the present embodiment refers to a permanent magnetic track brake where turnable permanent magnets 14 are arranged one after the other in the direction of motion, with their axes of rotation being perpendicular to the running surface of the track. Stationary permanent magnets may be arranged between the turnable permanent magnets.

On the upper faces of the permanent magnets, gear wheels 15 are provided in which a toothed rack 16 engages for the purpose of switching on and off. A piston rod 17 with its piston 18 is fastened to at least one end of the toothed rack 16. The piston 18 is arranged in a cylinder 19 such that it is shiftable and can be moved by compressed air from the compressed air line 21 against the spring tension of a pressure spring 20. If compressed air is directed onto the piston 18, the piston rod 17 and the toothed rack 16 connected therewith move to the left in the direction indicated by arrows so that the permanent magnets 14 are turned to the switched off position.

The view according to FIG. 2 shows the brake in switched on position. In this case the compressed air is led off and the piston 18 is shifted to the right final position by the pressure spring 20. If, in this position, the brake is lowered onto the track in vertical direction, braking by frictional forces is started. At this moment the automatic control according to the invention becomes effective in order to avoid a sudden or jerky braking of the track-bound vehicle. As a result of the brake shoes or brake blocks 22 touching the track, the brake is shifted in opposite direction to the direction of motion 23 of the vehicle, as illustrated by the arrow in FIG. 2. However, this shifting takes place only when the braking force is higher than the initial tension of the spring 11. Because of the stationary toothed rack 16 and the shifting of the brake 1, the permanent magnets 14 are turned through the gear wheels 15 to the switched off position in the direction of the drawn-in arrow. Thus, the braking force is reduced and an average value of the braking force or deceleration results which is dependent on the pressure exerted by the brake on the spring 11 and the counteracting force produced by the spring. This ensures that braking is started smoothly. By supplying the cylinder 19 with more or less compressed air, the braking force can be reduced furthermore.

At standstill of the vehicle, the cylinder 19 is fully charged with compressed air so that due to the shifting of the toothed rack 16 to the left, the brake is switched off completely since, depending on the brake design, the lines of magnetic flux short-circuit through iron pole pieces or a compensation of the magnetic flux occurs. Thereafter, the brake can be lifted from the track in known manner by pneumatic or hydraulic means. During lifting the brake is guided by guiding elements 3 fastened to the vehicle.

The invention is not restricted to the aforedescribed embodiment. Instead of pressure or tension springs it is also possible to provide other pressure dependent control elements as e.g. pressure boxes or electrical, pneumatic or hydraulic control elements. The use of the control device according to the invention is not limited to permanent magnetic track brakes which are provided with turnable permanent magnets arranged perpendicular to the track plane in the direction of motion. The control device can e.g. also be used for track brakes, where the axis of rotation of the permanent magnets is parallel to the track in the direction of motion, or for friction brakes having poles of alternate polarity arranged in longitudinal direction of the track.

The control device is also suitable for electromagnetically excited brakes by changing the exciting current through pressure or tension dependent control elements which are connected with resistors, thyristors or similar control elements.

Having described my invention, I claim:

1. In an eddy current and/or friction track brake for a moving vehicle which is infinitely variable by means of movable permanent magnets, preferably arranged such that poles of alternate polarity result in the direction of motion, and which can be lowered onto the track for the purpose of braking by frictional forces, said brake including a movable member coacting with said magnets to move same between a brake on to a brake off position, the improvement which comprises: means mounting said brake on the vehicle such that it is shiftable relative to the vehicle in the direction of motion and of a distance corresponding to a required control range, a control element between at least one end face of said brake and a part fastened to the vehicle, said element being operatively connected with said member for moving said permanent magnets in response to forces on said brake produced during braking by frictional forces with the track, said control element acting to reduce the braking force by moving said permanent magnets toward the brake off position whereby the permissible deceleration force is not exceeded.

2. The improvement of claim 1 wherein said control elements include pressure springs.

3. The improvement of claim 1 wherein said means include a supporting body and said brake is supported for shifting in the direction of motion by means of guide bolts and spring bolts and is held in central position by pressure springs under initial tension, with said supporting body being fastened to the vehicle and guided for movement in vertical direction.

4. The improvement of claim 2 wherein said means include a supporting body and said brake is supported for shifting in the direction of motion by means of guide bolts and spring bolts and is held in central position by pressure springs under initial tension, with said supporting body being fastened to the vehicle and guided for movement in vertical direction.

5. The improvement of claim 1 wherein said control element includes means biasing said brake in the direction of movement of the vehicle.

6. The improvement of claim 5 wherein said means includes electrical operating means.

7. The improvement of claim 5 wherein said means includes pneumatic operating means.

8. The improvement of claim 5 wherein said means includes hydraulic operating means.

9. The improvement of claim 5 wherein said means includes mechanical operating means.

* * * * *